US012340485B1

(12) United States Patent
Thottappilly et al.

(10) Patent No.: US 12,340,485 B1
(45) Date of Patent: Jun. 24, 2025

(54) GRAPHICS GEOMETRY PROCESSING WITH SEGMENTED AND NON-SEGMENTED SETS OF WORK

(71) Applicant: Apple Inc., Cupertino, CA (US)

(72) Inventors: Arjun Thottappilly, Oviedo, FL (US);
Jason D. Carroll, Oviedo, FL (US);
Benjamin Bowman, London (GB)

(73) Assignee: Apple Inc., Cupertino, CA (US)

( * ) Notice: Subject to any disclaimer, the term of this patent is extended or adjusted under 35 U.S.C. 154(b) by 430 days.

(21) Appl. No.: 18/053,662

(22) Filed: Nov. 8, 2022

Related U.S. Application Data

(60) Provisional application No. 63/376,317, filed on Sep. 20, 2022.

(51) Int. Cl.
*G06T 1/60* (2006.01)
*G06T 3/4038* (2024.01)
*G06T 15/00* (2011.01)

(52) U.S. Cl.
CPC .............. *G06T 3/4038* (2013.01); *G06T 1/60* (2013.01); *G06T 15/005* (2013.01)

(58) Field of Classification Search
CPC . G06F 9/3885; G06T 1/20; G06T 1/60; G06T 3/4038; G06T 15/005
USPC ......................................................... 345/506
See application file for complete search history.

(56) References Cited

U.S. PATENT DOCUMENTS

| | | | |
|---|---|---|---|
| 5,821,950 A * | 10/1998 | Rentschler | G06T 1/20 345/503 |
| 6,181,346 B1 * | 1/2001 | Ono | G06T 11/40 345/506 |
| 10,803,547 B2 | 10/2020 | Kakarlapudi | |
| 11,298,062 B2 | 4/2022 | Ellison | |
| 2008/0129748 A1 * | 6/2008 | Bakalash | G06F 9/5066 345/505 |
| 2019/0108671 A1 * | 4/2019 | Rollingson | G06T 15/005 |

FOREIGN PATENT DOCUMENTS

WO 2012059577 A1 5/2012

* cited by examiner

*Primary Examiner* — Jacinta M Crawford
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to geometry processing in graphics processors. In some embodiments, geometry processing circuitry is configured to execute multiple segments of a segmented set of geometry work at least partially in parallel using multiple geometry processing pipelines, execute a single-segment set of geometry work using a single geometry processing pipeline, and identify a group of multiple sets of geometry work that includes the segmented set and the single-segment set. Fragment processing circuitry may be configured to initiate execution of a single set of fragment processing work that consumes output data from the multiple sets of geometry work in the group. The geometry processing circuitry may utilize disclosed techniques to process the segmented and single-segment sets in a manner than mitigates overhead associated with segmented processing.

20 Claims, 8 Drawing Sheets

*Scenario A*

*Scenario B*

*Scenario C*

*Scenario D*

GRAPHICS GEOMETRY PROCESSING WITH SEGMENTED AND NON-SEGMENTED SETS OF WORK

The present application claims priority to U.S. Provisional Application No. 63/376,317, entitled "Graphics Geometry Processing with Segmented and Non-Segmented Sets of Work," filed Sep. 20, 2022, the disclosure of which is incorporated by reference herein in its entirety.

BACKGROUND

Technical Field

This disclosure relates generally to graphics processors and more particularly to handling mapping between geometry work and fragment work.

Description of the Related Art

Graphics processors typically execute geometry work (determining triangle positions based on the viewpoint, determining aspects of triangles, etc.) then execute fragment/pixel work that operates on the outputs of the geometry work. Traditionally, there is a 1:1 mapping between a set of geometry work (which may be referred to as a "geometry kick") and a set of fragment work (or "fragment kick") that consumes its outputs.

DETAILED DESCRIPTION

Figure 1A:
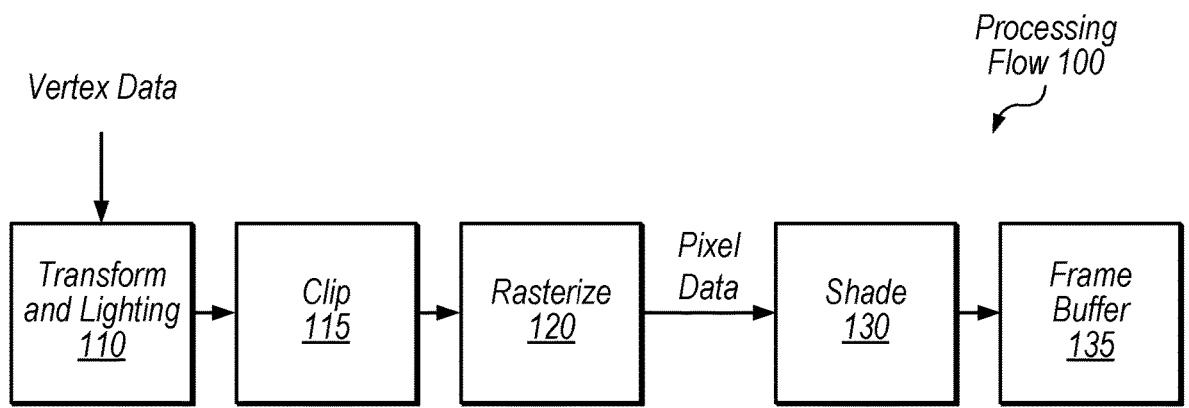
FIG. 1A is a diagram illustrating an overview of example graphics processing operations, according to some embodiments.

In some embodiments, rather than a 1:1 mapping, N sets of geometry work ("kicks") may be grouped and one set of fragment work may consume their outputs, according to an N:1 mapping. Further, a given geometry kick in a group of N kicks may either be segmented for parallel processing by multiple geometry processing pipelines or non-segmented.

Segmented geometry kicks may improve performance by processing parts of a kick in parallel but may involve processing overhead, e.g., to pre-parse the control stream into segments and to stitch segment outputs together. Rather than incurring this overhead for all geometry kicks in a group, whether segmented or not, techniques discussed in detail below may intelligently handle segmented and non-segmented kicks in various scenarios.

In particular, disclosed embodiments may use the same segment identifier for a non-segmented kick as for one segment of a segmented kick, such that the output data is appended to the same data structure and stitching need not be performed between those portions of the group. This may reduce processing costs and improve performance, reduce power consumption, or both, relative to traditional techniques.

In some embodiments, a different mode of operation may treat all kicks as segmented, which may incur greater processing overhead in some scenarios but may allow other advantages, such as interleaving geometry kicks on a list of free memory pages.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
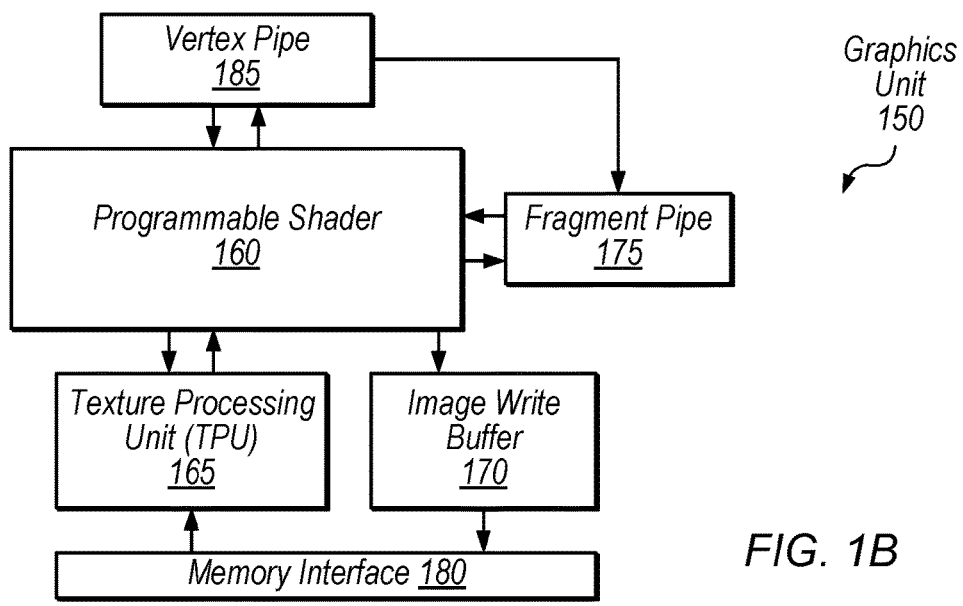
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Geometry Continuation Techniques

Figure 2:
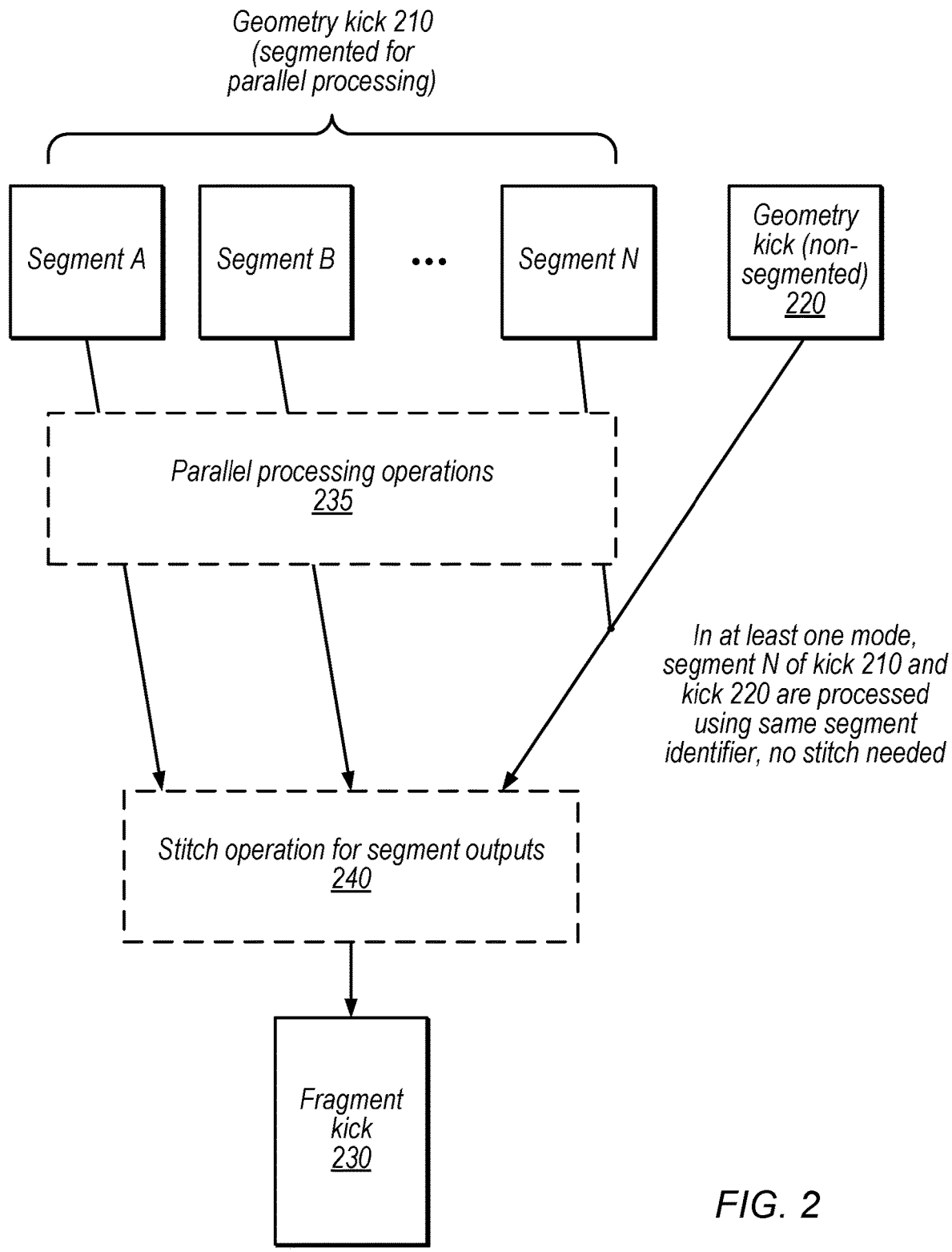
FIG. 2 is a diagram illustrating example processing of a segmented kick and a non-segmented kick, according to some embodiments.

FIG. 2 is a diagram illustrating example processing of multiple sets of geometry work as a group, according to some embodiments. This may be referred to as "geometry continuation" and may allow an N:1 mapping between geometry kicks in a "continuation group" and a fragment kick.

In the illustrated embodiment, geometry kicks 210 and 220 are included in a group of geometry kicks whose outputs are processed by one fragment kick 230. Kick 210 is segmented for parallel processing (segments A-N) and kick 220 is non-segmented (non-segmented kicks may also be referred to as "single-segment" kicks).

As shown, segments A-N are processed at least partially in parallel according to parallel processing operations 235, which may be performed by different processing pipelines, as discussed in detail below.

In some embodiments, stitch circuitry is configured to perform stitch operation 240 to stitch outputs of the parallel processing operations. For example, the stitch operation may link lists of closed pages that store output data generated by geometry processing, layer identifier cache information, region array information, etc. Example stitching techniques are discussed in detail in U.S. application Ser. No. 17/805,607 filed on Jun. 6, 2022, which is incorporated by reference herein in its entirety.

A layer identifier cache may allow the geometry processing phase to specify a layer of a final render target. A region array may be used for tile-based deferred rendering (TBDR) in which tiling engine circuitry may bin geometry into tiles and generate control streams to be processed by fragment processing circuitry (e.g., with a number of per-tile linked lists). Generally, stitch circuitry may link various outputs of geometry processing segments of a geometry kick are processed in parallel.

The stitch operation generates input data for a fragment kick initiated by fragment processing circuitry 340, in the illustrated embodiment.

As shown, some segments may be processed sequentially using the same segment identifier (e.g., appending to the same list(s)) such that stitching is not needed. This may reduce processing overhead associated with segmenting kicks, in some situations. In the illustrated example, segment N and the single segment of kick 220 use the same segment identifier (which may cause geometry pipeline circuitry to write outputs to the same data structure(s) for these two segments, e.g., the closed page list). Therefore, in this example, no stitch operation is needed between the outputs of segment N and kick 220. As shown, three inputs are stitched, the output of segment A, the output of segment B, and the combined output of segment N and kick 220.

Therefore, stitch circuitry links three data structures in this example where at least four link operations would be needed if all kicks were treated as segmented (e.g., if segment N and kick 220 used different segment identifiers).

In some embodiments, for non-final kicks, the processor may pause stitching and then complete stitching in the background when the group continues at a later point. This may allow interleaving of completion groups while properly handling out-of-memory conditions.

Figure 3:
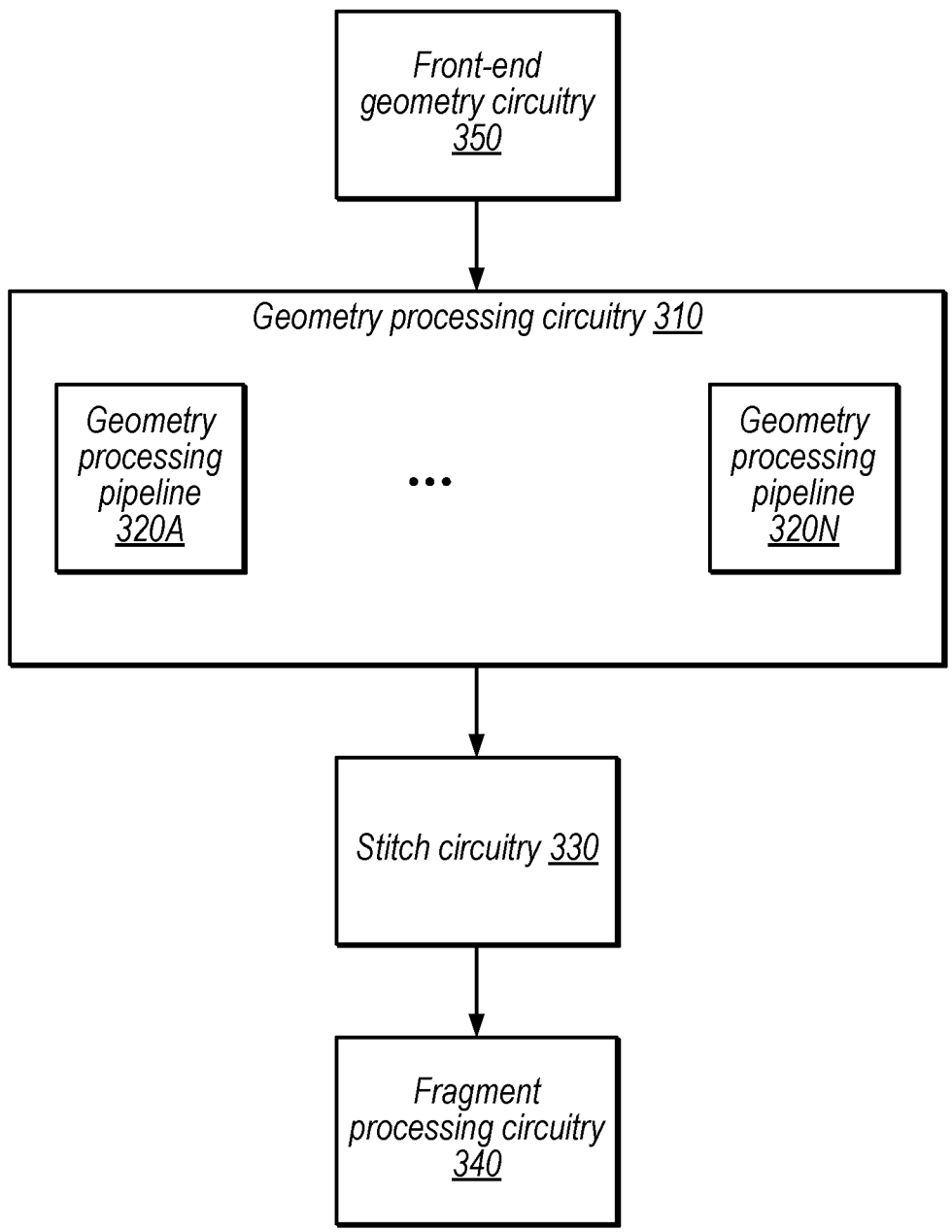
FIG. 3 is a block diagram illustrating example geometry processing circuitry, stitch circuitry, and fragment processing circuitry, according to some embodiments.

FIG. 3 is a block diagram illustrating example circuitry configured to implement the techniques discussed above. In the illustrated example, front-end geometry circuitry provides work (e.g., in a control stream) to geometry processing circuitry 310, which includes multiple geometry processing pipelines 320. Stitch circuitry 330 is configured to link outputs of the different pipelines, in some situations, and provide stitched results to fragment processing circuitry 340.

In some embodiments, geometry processing pipelines 320 are included in multiple GPU sub-units (which may be referred to as mGPUs). In some embodiments, control circuitry may distribute segments of a given geometry kick for processing by multiple different mGPUs. Geometry processing pipelines 320 may be fixed-function circuitry configured to launch vertex shaders or may launch object shaders and mesh shaders, for example.

In some embodiments, a segment launched by vertex data control circuitry on an mGPU is assigned a segment ID in sequential fashion and this segment ID defines the age of the segment. Each of the segments may start, finish, and in general, work independently of each other. Additional kick segments may be launched as and when a geometry pipeline becomes available. This distributed processing of kick segments may advantageously improve performance relative to traditional geometry processing techniques, particularly for large kicks or when there are substantial dependencies between kicks.

Control circuitry, in some embodiments, may include primary and distributed portions in embodiments with multiple mGPUs. The distributed control circuitry may interact with primary control circuitry to procure pages from a page pool for geometry processing, e.g., via a page request/grant interface. In some embodiments, distributed control circuitry is implemented for each geometry pipeline, one or more of which may be included on each mGPU. The distributed control circuits may interact with geometry pipelines to allocate pages for geometry processing output and close pages that are complete.

Control circuitry may also create and maintain a list of closed pages for a given segment. Control circuitry may also procure pages from the page pool to store the list. In some embodiments, the list is a linked list, which may be referred to as a linked list of closed pages (LLCP). Primary control circuitry, in some embodiments, is configured to manage the page pool in memory and may route requested pages to the appropriate distributed control circuit.

Stitch circuitry 330, in some embodiments, is configured to stitch various outputs of segments. This may include stitching the lists of closed pages for different segments of a given multi-segment geometry kick to generate a consolidated list of closed pages for the set of geometry work. Note that the list may be stored in memory or in a cache. Stitch circuitry 330 may provide consolidated outputs to fragment processing circuitry 340, which may traverse the LLCP and deallocate pages as they are consumed. Fragment processing circuitry 340 may launch fragment shaders on one or more shader cores.

In some embodiments, stitch circuitry 330 is configured to stitch lists for up to N segments at a time, and these segments may be referred to as a stitch set. In some embodiments, stitch circuitry 330 maintains a segment-id-mask, a seg-start pointer, and a seg-end pointer. The segment-id-mask may track segments that have completed processing on geometry processing circuitry 310 and are ready for stitching. The seg-start pointer may point to the segment ID from which the next stitch operation should start and the seg-end pointer may refer to the last segment for the stitch set. In some embodiments, when a stitch operation is completed, stitch circuitry 330 communicates the seg-end pointer to the front-end geometry circuitry 350, e.g., so that it can re-use those segment IDs to launch new work. In some embodiments, a stitch set is not stitched until all of its segments are ready and the stitching circuitry does not move to the next stitch set until the current set is stitched.

In some embodiments, control circuitry for geometry processing circuitry 310 is configured to generate data for various control fields to facilitate N:1 mapping of geometry kicks to fragment kicks. For example, a stitch enable field may indicate whether stitching is enabled. An initial segment field may indicate the first segment in a continuation group. A last segment field may indicate the last segment in a continuation group. A complete stitch field may indicate whether stitching of older segment identifiers must be complete before ending a given set of geometry work. In some embodiments, stitching must be complete for the youngest segment of a non-final kick when a continuation group has included at least one segmented kick.

The following table sets out example valid geometry kick start states, according to some embodiments:

| stitch_enable | initial_segment | last_segment | description |
|---|---|---|---|
| 0 | 1 | 1 | Non-segmented kick that is not part of a continuation group |
| 1 | 0 | 0 | Mid segment of a segmented kick |
| 1 | 0 | 1 | Last segment of a segmented kick. When GTP continuation feature is enabled, this state will indicate the last segment of the final kick within the continuation group |
| 1 | 1 | 0 | Initial segment of a group. When GTP continuation feature is enabled, this state will indicate the initial segment used within the continuation group |
| 1 | 1 | 1 | The final kick within a continuation group that only encountered single-segment kicks |

Example Scenarios

Figure 4:
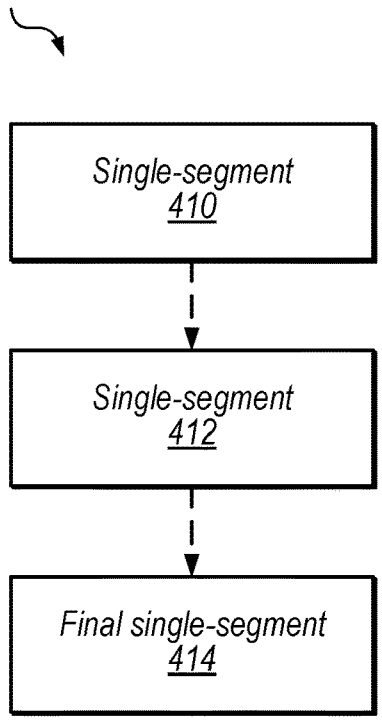
FIG. 4 is a diagram illustrating example scenarios with different sequencing of single-segment and segmented geometry kicks, according to some embodiments.
Figure 4:
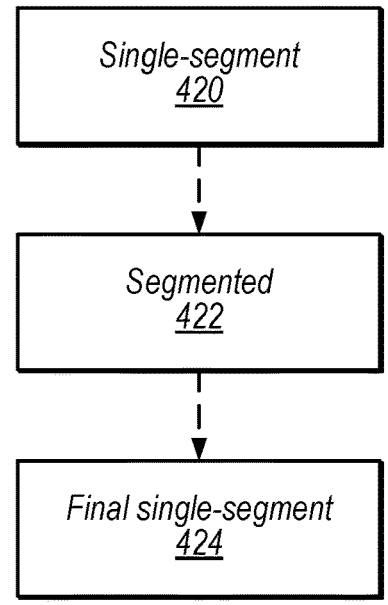
Figure 4:
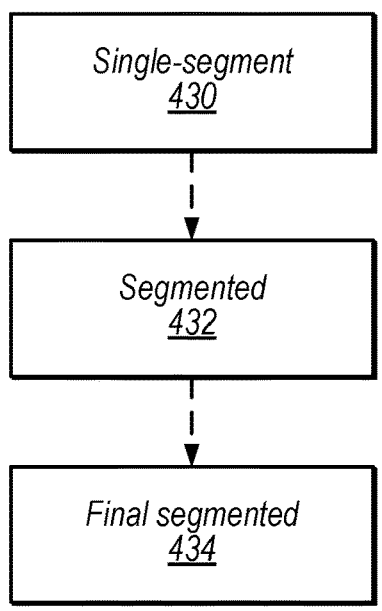
Figure 4:
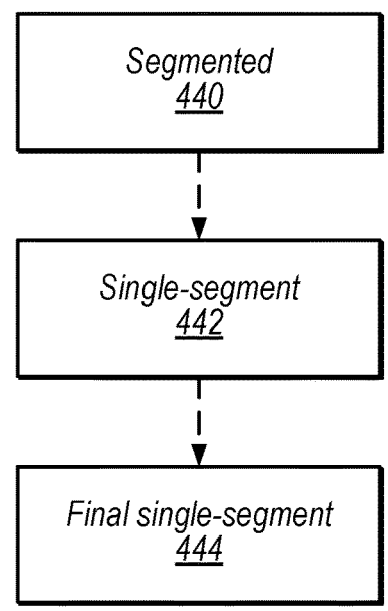

FIG. 4 is a diagram illustrating four example scenarios with different sequences of segmented and single-segment kicks, according to some embodiments.

Scenario A, in the illustrated example, includes a single-segment kick 410, followed by a single-segment kick 412, followed by a final single-segment kick 414. In some embodiments, front-end geometry circuitry 350 may launch the first kick 410 on segment ID 0 with stitch enable=1, complete stitch=0, initial segment=1, and last segment=0 (where a 0 value indicates false and a 1 value indicates true for a given field). Note that tiling engine circuitry may use different control block formats depending on whether stitch enable is set.

When kick 410's work completes, it may be terminated and context switch out internally to allow re-use of the segment identifier. Control circuitry may forward a context switch terminate indication down a geometry pipeline to trigger the pipeline to store internal state to memory. Once kick 410's state has been successfully saved, control circuitry may end the kick and proceed to kick 412.

Control circuitry may launch the second kick as a context switch resume on the same segment ID=0, with stitch enable=1, complete stitch=0, initial segment=1, and last segment=0. Front-end geometry circuitry 350 may use a side-band interface to inform other circuitry of the context resume (e.g., a parameter manager that controls a parameter buffer that lists free pages). Because of the context resume and re-use of the segment identifier, the parameter manager may continue appending to an earlier-generated list of closed pages for segment ID=0. This may advantageously avoid a stitch operation between outputs of kick 410 and 412.

A similar context switch may be used for final kick 414, which may also use segment ID=0, with stitch enable=1, complete stitch=0, initial segment=1, and last segment=1. When the work for kick 414 is complete, front-end geometry circuitry 350 may terminate the kick.

Stitch circuitry 330 may recognize that although the kick was initially launched with stitching enabled, work was only launched on the initial segment of the completion group, so no stitching may be needed. The contents of various output data structures may therefore be directly forwarded to the fragment processing circuitry 340.

Scenario B, in the illustrated example, includes a single-segment kick 420, followed by a segmented kick 422, followed by a final single-segment kick 424. Front-end geometry circuitry 350 may launch the first kick 420 with stitch enable=1, complete stitch=0, initial segment=1, and last segment=0. This kick may be context switched out once finished, similarly to kick 410 discussed above.

Front-end geometry circuitry 350 may then launch the first segment of kick 422 on segment ID=0 as a context switch resume with stitch enable=1, initial segment=1, and last segment=0. Front-end geometry circuitry 350 also launches work on remaining segments (e.g., segment IDs 1-3 for a four-segment kick), where these segments will have stitch enable=1, initial segment=0, and last segment=0.

In one mode of operation, the last segment ID=3 is launched with complete stitch=0. Once work completes, segment ID=3 is context switch saved. At this point, stitch circuitry 330 may pause stitching operations and save internal state to memory. This may allow stitching to be paused until near the end of the completion group.

Front-end geometry circuitry 350 may then launch the final kick 424 as a context resume with stitch enable=1, initial segment=0, and last segment=1, using segment ID=3. Front-end geometry circuitry 350 may terminate the segment once all work completes, given that it is the last segment in the completion group. Stitch circuitry 330 may then stitch data structures for all completed segments. Scenario B may result in stitching of only N−1 sets of data structures where N is the number of segments in kick 422, given that the first and last segments share segment IDs with other kicks.

Scenario C, in the illustrated example, includes a single-segment kick 430, followed by a segmented kick 432, followed by a final segmented kick 434. The first two kicks 430 and 432 may be processed similarly to kicks 420 and 422 of scenario B. The third kick 434 may be launched as a context resume kick using segment ID=3, stitch enable=1, initial segment=0, and last segment=0. Front-end geometry circuitry 350 may launch the rest of the segments on subsequent segment IDs. For mid segments, stitch enable=1, initial segment=0, and last segment=0. For the last segment, stitch enable=1, initial segment=0, and last segment=1.

Scenario D, in the illustrated example, includes a segmented kick 440, followed by a single-segment kick 442, followed by a final single-segment kick 444. Consider an example where segmented kick 440 has four segments. In this example, front-end geometry circuitry 350 may launch the segments on segment IDs 0-3. When work completes, segments ID's 0-2 terminate and are available for stitching, while segment ID=3 may be context switch saved for use by kick 442. Stitch circuitry 330 may pause further stitching at this point.

Kick 442 may be launched as a context resume using segment ID=3 and kick 444 may similarly use segment ID=3 (e.g., similar to kicks 412 and 414 using the same segment ID as discussed above).

In some embodiments, control circuitry implements the following generalized rules to produce the results discussed above for different scenarios. For single-segment kicks, if the kick is the first geometry kick in a continuation group, front-end circuitry launches it on segment ID=0 and the kick start will indicate initial segment=1. If the kick is a continued kick, front-end circuitry launches it as a context resume kick. Control circuitry may indicate to parameter manager circuitry that a kick is being context resumed. If the continuation group has not encountered a segmented kick as yet, this kick should be launched as a context switch resume on the same mGPU as before and on segment ID=0. Initial segment remains at 1 in this case. If the continuation group has already encountered a segmented kick, this kick should get launched on the next available segment ID as the start of a new segment. Initial segment=0 for this kick. If the geometry pipeline circuitry sees a context switch resume, it loads internal state from memory so that it can continue appending to control stream generated by a previous segment. Similarly, tile engine circuitry may append to data structures associated with the segment ID.

If the kick is not the final kick of the continuation group, it is launched with last segment=0 and complete stitch. Once all work completes, if no segmented kicks have been encountered, the segment is context switch saved, stitching is paused, and the kick is ended. If the kick is the final kick in a completion group, it is launched with last segment=1 and is end-of-segment terminated once the work completes. If initial segment is still 1, then segmentation was never really used and no stitching needs to be performed. Otherwise, all pending stitch operations may be completed before ending the kick.

Similar rules may be implemented for segmented kicks, but with potentially different handling of first and last segments in a segmented kick, as discussed above. Note that software context switches that switch out a geometry kick that is part of a continuation group may retain control field values (e.g., initial segment, final segment, etc.) when switching back in.

Example Mode without Reduced Stitching

In some embodiments, a graphics processor is configured to operate in a first mode as discussed above with reference to FIG. 4 but also is configured to operate in a second mode in which all kicks are treated as segmented, and every segment (including single-segment kicks) is stitched. In some scenarios, this may advantageously allow software to interleave kicks from multiple continuation groups to the same set of free pages (also referred to as a parameter buffer).

As one example, in the second mode of operation and scenario B of FIG. 4, where segmented kick 422 includes four segments, five stitch operations may be performed between the six segments of kicks 420, 422, and 424.

Consider an example where two continuation groups X and Y are interleaved onto the same parameter buffer. In this scenario, it is possible for a non-final segment of group X to have consumed most of all of the pages in the parameter buffer, thereby causing group Y to run into an out of memory (OOM) situation. Partial render of group Y may not guarantee forward progress of all the pages allocated to group X. In this scenario, subsequent kicks from group X, after partial render by the fragment processing circuitry 340, may be launched as if they are the start of a new continuation group. Software may de-queue all group X kicks, patch them up, and re-queue them when group Y experiences an OOM scenario. Then fragment render of group X may again be initiated.

In the second mode of operation, the youngest segment of a segmented kick that is non-final may be launched with complete stitch=1 such that stitching must be complete (as well as older segment IDs). For example, in scenario B of FIG. 4, segment ID=3 of kick 422 may have complete stitch=1 in the second mode such that it is stitched before the kick ends. In this scenario, the final single-segment kick 424 will get its own segment ID=4 instead of sharing and thus will need to be stitched with the output of segmented kick 422.

Example Software-Initiated Stitching

As discussed above, software may control whether to operate in a more efficient mode in which segment IDs are re-used in some scenarios and a less efficient mode in which segment IDs are not re-used (but may allow software to interleave kicks from different continuation groups onto the same set of free pages). Consider an example where two continuation groups A and B are mapped to the same parameter buffer. It is possible for most of the pages in the parameter buffer to be consumed by continuation group A that hasn't completed the final kick in the group as yet. When a kick from continuation group B gets launched on the same parameter buffer, it may experience an out of memory condition. Trying to partial render group B may not free up enough pages to make forward progress. In this situation, software may partial render the non-final group A in the background (e.g., without involvement from geometry pipeline hardware).

In some embodiments, software-initiated stitching may allow hardware to always work in the more efficient mode by giving software the ability to initiate a hardware stitch of kick segments before it initiates a background partial render of a non-final group. For example, consider the case where kicks from multiple continuation groups are interleaved to the same parameter buffer. In this case, when a kick from a continuation group runs out of memory, the following handshake between hardware and software may be implemented.

First, parameter manager circuitry raises an out of memory interrupt. Second, software receives the interrupt and decides to background partial render another group that is not currently getting executed on geometry processing hardware 310. Because the group was run using the efficient mode, it will not be in a state that can be readily partial rendered by fragment processing circuitry 340. Therefore, software initiates a stitch operation in parameter manager hardware.

Hardware provides a set of programmable registers that are software programmable to provide the parameter manager hardware with information to stitch segments together. For example, this may include base and segment base addresses for a closed page list, stitch base address, screen size control registers, etc.

Parameter manager hardware may, in response to programming of the register, fetch a state from the stitch base address to determine what segments have been stitched and what segments need to be stitched. It may then initiate stitch operations on all pending segments based on the programmed base and segment base addresses. Once complete, it may initiate a software-stitch-complete interrupt, which may allow software to determine that the group is in a state that can be rendered by fragment processing circuitry 340, and may initiate the fragment partial render kick.

Example Method

Figure 5:
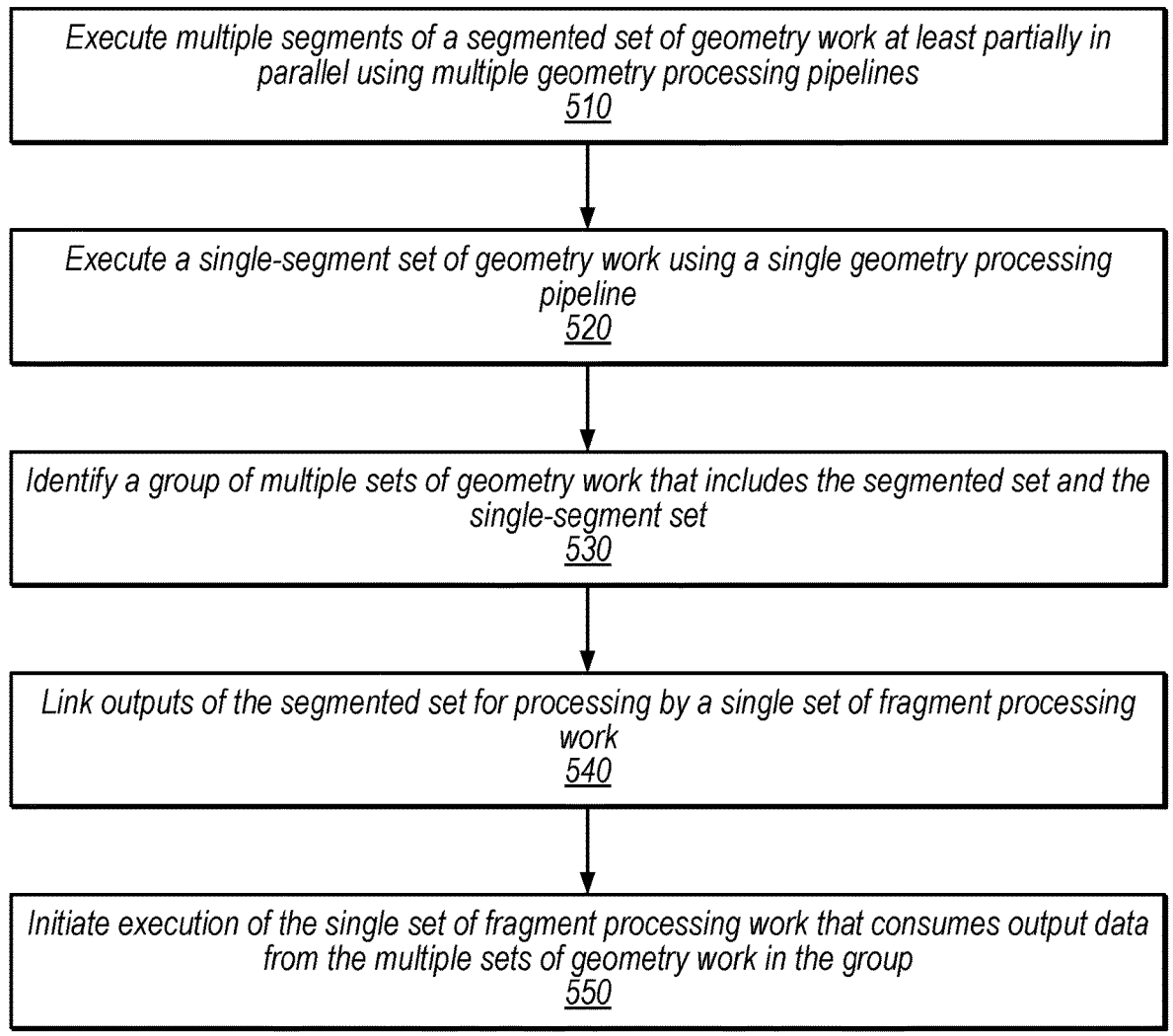
FIG. 5 is a flow diagram illustrating an example method, according to some embodiments.

FIG. 5 is a flow diagram illustrating an example method for processing segmented and single-segment sets of geometry work, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, a computing device executes multiple segments of a segmented set of geometry work at least partially in parallel using multiple geometry processing pipelines.

At 520, in the illustrated embodiment, the computing device executes a single-segment set of geometry work using a single geometry processing pipeline.

At 530, in the illustrated embodiment, the computing device identifies a group of multiple sets of geometry work that includes the segmented set and the single-segment set.

At 540, in the illustrated embodiment, the computing device links outputs of the segmented set for processing by a single set of fragment processing work. In some embodiments, the computing devices uses a same segment identifier and output data structure for both the single-segment set and a first segment of the segmented set, such that the single-segment set and the first segment of the segmented set do not need a linking operation.

In some embodiments, the linked outputs include a list of closed memory pages for the group and a region array for tile-based deferred rendering that includes an entry per tile of a graphics frame that indicates geometry for the tile.

At 550, in the illustrated embodiment, the computing device initiates execution of the single set of fragment processing work that consumes output data from the multiple sets of geometry work in the group.

In some embodiments, control circuitry generates one or more control fields that specify the following information for one or more segments: stitch enable information that indicates whether stitching is enabled, initial segment information that indicates the first segment of the group, last segment information that indicates the last segment of the group, and complete stitch information that indicates whether a segment is the youngest segment of a non-final set of geometry work. The complete stitch information may indicate whether stitching of older segment identifiers must be complete before ending a given set of geometry work.

In some embodiments, the geometry processing circuitry is configured to process segments according to: a first mode in which one or more segment identifiers are used for multiple segments in a group, and a second mode in which all segments in a group are assigned different segment identifiers and stitched.

In some embodiments, the geometry processing circuitry is configured to pause linking in the first mode for a non-final set of geometry work in a group and resume linking in response to later processing of work in the group. In some embodiments, control circuitry is configured to select the second mode based on interleaving of multiple groups of sets of geometry work onto a buffer that indicates available memory pages.

In some embodiments, control circuitry is configured to: access a set of configuration registers, where the registers are programmable based on an out of memory signal, fetch state information from the set of configuration registers to determine a set of segments to stitch, stitch the set of segments based on base address information from the set of configuration registers, and initiate a stitch complete signal to enable software to initiate a partial render fragment operation.

In some embodiments, the group includes a first single-segment set of geometry work, followed by a second single-segment set of geometry work, followed by a final single-segment set of geometry work, and the geometry processing circuitry is configured to use the same segment identifier for the first, second, and final single-segment sets of geometry work and the fragment processing circuitry is configured to receive the output data without stitching operations being performed between any of the first, second, and final single-segment sets of geometry work.

In some embodiments, the group includes a first single-segment set of geometry work, followed by a segmented set of geometry work, followed by a final single-segment set of geometry work, and the geometry processing circuitry is configured to use the same segment identifier for an initial segment of the segmented set of geometry work and the first single-segment set of geometry work, and the stitch circuitry is configured to defer linking outputs of the segmented set until processing of the final single-segment set of geometry work.

In some embodiments, the group includes a single-segment set of geometry work, followed by a first segmented set of geometry work, followed by a final segmented set of geometry work, and the geometry processing circuitry is configured to use the same segment identifier for a last segment of the first segmented set of geometry work and an initial segment of the final segmented set of geometry work.

Example Device

Figure 6:
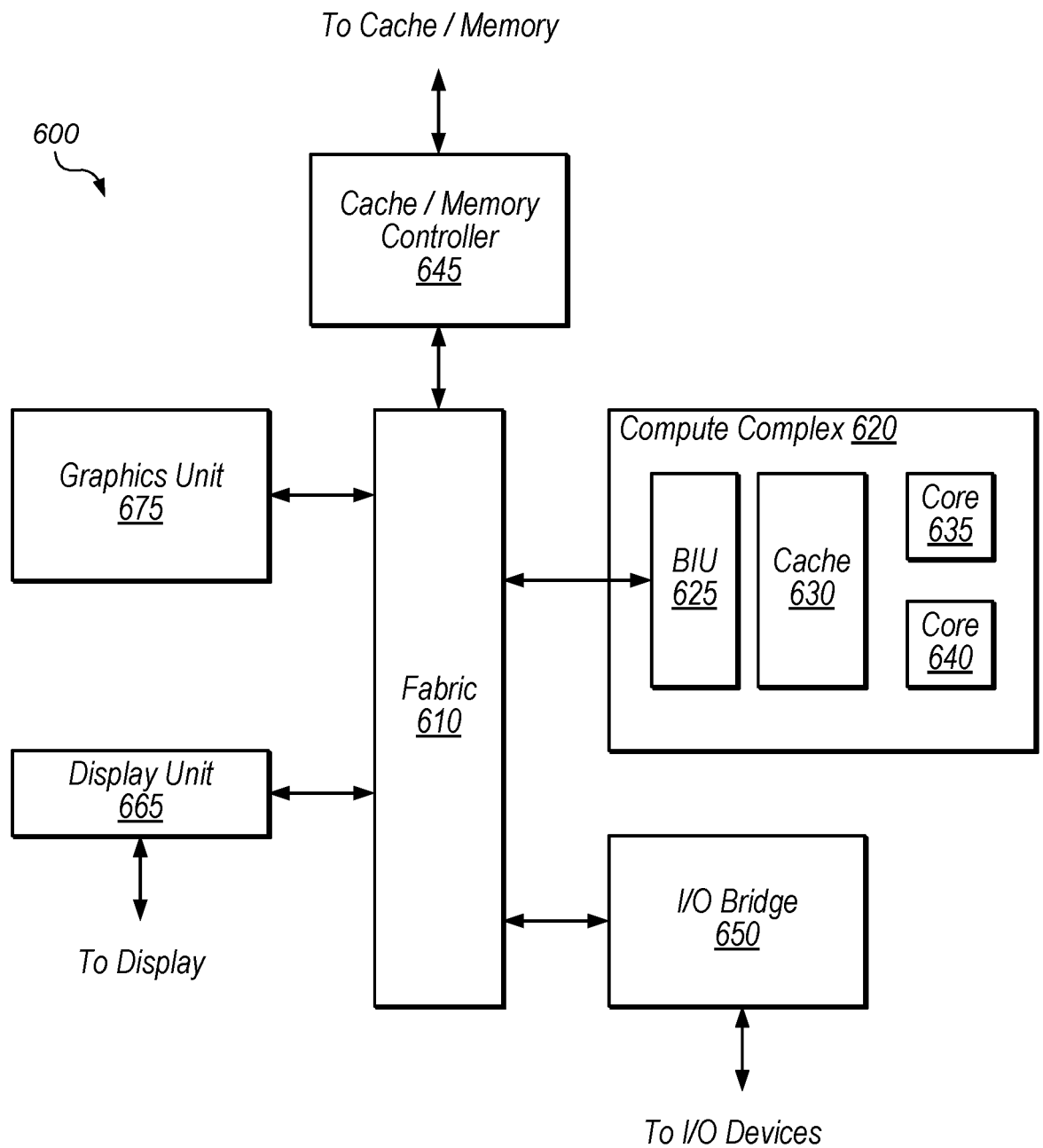
FIG. 6 is a block diagram illustrating an example computing device, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 675, and display unit 665. In some embodiments, device 600 may include other components (not shown) in addition to or in place of the illustrated components, such as video processor encoders and decoders, image processing or recognition elements, computer vision elements, etc.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and caches. For example, compute complex 620 may include 1, 2, or 4 processor cores, or any other suitable number. In one embodiment, cache 630 is a set associative L2 cache. In some embodiments, cores 635 and 640 may include internal instruction and data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 675 may be described as "coupled to" a memory through fabric 610 and cache/memory controller 645. In contrast, in the illustrated embodiment of FIG. 6, graphics unit 675 is "directly coupled" to fabric 610 because there are no intervening elements.

Graphics unit 675 may include one or more processors, e.g., one or more graphics processing units (GPU's). Graphics unit 675 may receive graphics-oriented instructions, such as OPENGL®, Metal, or DIRECT3D® instructions, for example. Graphics unit 675 may execute specialized GPU instructions or perform other operations based on the received graphics-oriented instructions. Graphics unit 675 may generally be configured to process large blocks of data in parallel and may build images in a frame buffer for output to a display, which may be included in the device or may be a separate device. Graphics unit 675 may include transform, lighting, triangle, and rendering engines in one or more graphics processing pipelines. Graphics unit 675 may output pixel information for display images. Graphics unit 675, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 675 implements the segmented execution techniques discussed herein, which may improve performance in distributed hardware implementations.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and low-power always-on functionality, for example. I/O bridge 650 may also include interfaces such as pulse-width modulation (PWM), general-purpose input/output (GPIO), serial peripheral interface (SPI), and inter-integrated circuit (I2C), for example. Various types of peripherals and devices may be coupled to device 600 via I/O bridge 650.

In some embodiments, device 600 includes network interface circuitry (not explicitly shown), which may be connected to fabric 610 or I/O bridge 650. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 600 with connectivity to various types of other devices and networks.

Example Applications

Figure 7:
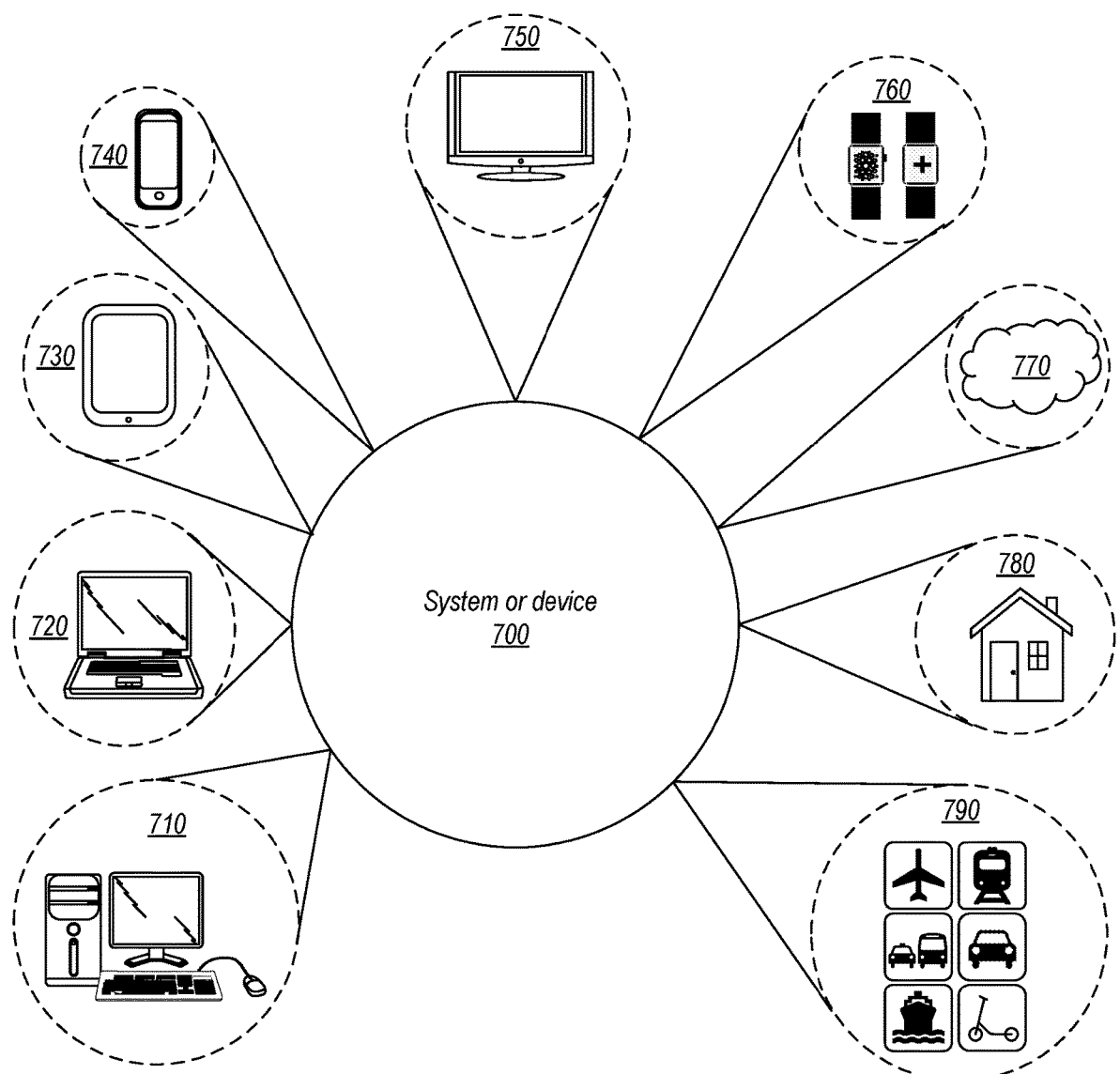
FIG. 7 is a diagram illustrating example applications of disclosed systems and devices, according to some embodiments.

Turning now to FIG. 7, various types of systems that may include any of the circuits, devices, or system discussed above. System or device 700, which may incorporate or otherwise utilize one or more of the techniques described herein, may be utilized in a wide range of areas. For example, system or device 700 may be utilized as part of the hardware of systems such as a desktop computer 710, laptop computer 720, tablet computer 730, cellular or mobile phone 740, or television 750 (or set-top box coupled to a television).

Similarly, disclosed elements may be utilized in a wearable device 760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 700 may also be used in various other contexts. For example, system or device 700 may be utilized in the context of a server computer system, such as a dedicated server or on shared hardware that implements a cloud-based service 770. Still further, system or device 700 may be implemented in a wide range of specialized everyday devices, including devices 780 commonly found in the home such as refrigerators, thermostats, security cameras, etc. The interconnection of such devices is often referred to as the "Internet of Things" (IoT). Elements may also be implemented in various modes of transportation. For example, system or device 700 could be employed in the control systems, guidance systems, entertainment systems, etc. of various types of vehicles 790.

The applications illustrated in FIG. 7 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
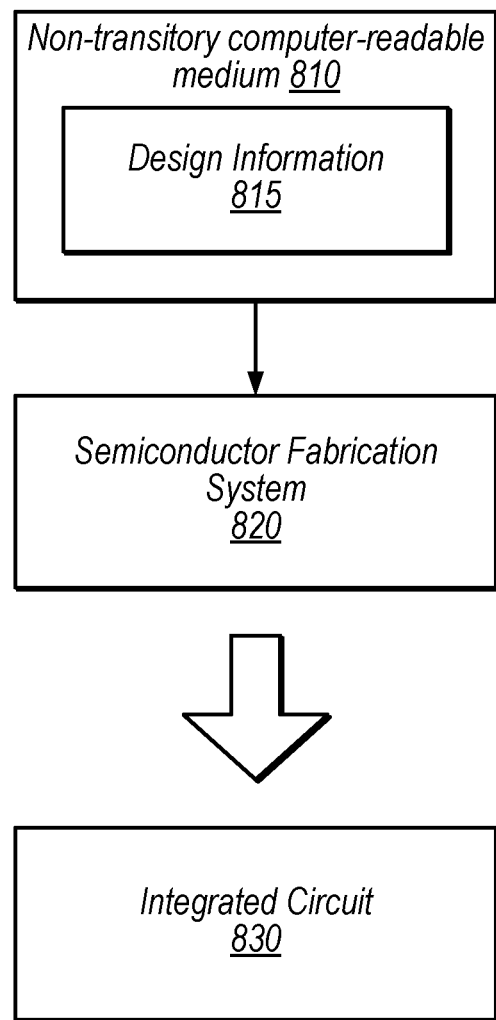
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, System Verilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis, layout, or both of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIGS. 1B, 3, and 6. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:
1. An apparatus, comprising:
geometry processing circuitry configured to:
execute multiple segments of a segmented set of geometry work at least partially in parallel using multiple geometry processing pipelines;
execute a single-segment set of geometry work using a single geometry processing pipeline;
identify a group of multiple sets of geometry work that includes the segmented set and the single-segment set;
fragment processing circuitry configured to initiate execution of a single set of fragment processing work that consumes output data from the multiple sets of geometry work in the group; and
stitch circuitry configured to link outputs of the segmented set for processing by the fragment processing circuitry;

wherein the geometry processing circuitry is configured to utilize a same segment identifier and output data structure for both the single-segment set and a first segment of the segmented set, such that the fragment processing circuitry receives the output data without a stitching operation between the single-segment set and the first segment of the segmented set.

2. The apparatus of claim 1, further comprising control circuitry configured to generate one or more control fields that specify the following information for one or more segments:
stitch enable information that indicates whether stitching is enabled;
initial segment information that indicates the first segment of the group;
last segment information that indicates the last segment of the group; and
complete stitch information that indicates whether a segment is the youngest segment of a non-final set of geometry work.

3. The apparatus of claim 1, wherein the geometry processing circuitry is configured to process segments according to:
a first mode in which one or more segment identifiers are used for multiple segments in a group; and
a second mode in which all segments in a group are assigned different segment identifiers and stitched.

4. The apparatus of claim 3, wherein the geometry processing circuitry is configured to pause linking in the first mode on termination of a non-final set of geometry work in the group and resume linking in response to later processing of the group.

5. The apparatus of claim 3, wherein control circuitry is configured to select the second mode based on interleaving of multiple groups of sets of geometry work onto a buffer that indicates available memory pages.

6. The apparatus of claim 1, wherein the group includes a first single-segment set of geometry work, followed by a second single-segment set of geometry work, followed by a final single-segment set of geometry work;
wherein the geometry processing circuitry is configured to use the same segment identifier for the first, second, and final single-segment sets of geometry work; and
wherein the fragment processing circuitry is configured to receive the output data without stitching operations being performed between any of the first, second, and final single-segment sets of geometry work.

7. The apparatus of claim 1, wherein the group includes a first single-segment set of geometry work, followed by a segmented set of geometry work, followed by a final single-segment set of geometry work;
wherein the geometry processing circuitry is configured to use the same segment identifier for an initial segment of the segmented set of geometry work and the first single-segment set of geometry work; and
wherein the stitch circuitry is configured to defer linking outputs of the segmented set until processing of the final single-segment set of geometry work.

8. The apparatus of claim 1, wherein the group includes a single-segment set of geometry work, followed by a first segmented set of geometry work, followed by a final segmented set of geometry work; and
wherein the geometry processing circuitry is configured to use the same segment identifier for a last segment of the first segmented set of geometry work and an initial segment of the final segmented set of geometry work.

9. The apparatus of claim 1, wherein the linked outputs include:
   a list of closed memory pages for the group; and
   a region array for tile-based deferred rendering that includes an entry per tile of a graphics frame that indicates geometry for the tile.

10. The apparatus of claim 1, further comprising control circuitry configured to:
   access a set of configuration registers, wherein the registers are programmable based on an out of memory signal;
   fetch state information from the set of configuration registers to determine a set of segments to stitch;
   stitch the set of segments based on base address information from the set of configuration registers; and
   initiate a stitch complete signal to enable software to initiate a partial render fragment operation.

11. The apparatus of claim 1, wherein the apparatus is a computing device that further comprises:
   a display;
   a central processing unit; and
   a network interface.

12. A method, comprising:
   executing, by a computing device, multiple segments of a segmented set of geometry work at least partially in parallel using multiple geometry processing pipelines;
   executing, by the computing device, a single-segment set of geometry work using a single geometry processing pipeline;
   identifying, by the computing device, a group of multiple sets of geometry work that includes the segmented set and the single-segment set;
   linking, by the computing device, outputs of the segmented set for processing by a single set of fragment processing work, wherein the computing devices uses a same segment identifier and output data structure for both the single-segment set and a first segment of the segmented set, such that the single-segment set and the first segment of the segmented set do not need a linking operation; and
   initiate, by the computing device, execution of the single set of fragment processing work that consumes output data from the multiple sets of geometry work in the group.

13. The method of claim 12, further comprising:
   generating, by the computing device, one or more control fields that specify the following information for one or more segments:
      stitch enable information that indicates whether stitching is enabled;
      initial segment information that indicates the first segment of the group;
      last segment information that indicates the last segment of the group; and
      complete stitch information that indicates whether a segment is the youngest segment of a non-final set of geometry work.

14. The method of claim 12, further comprising:
   operating, by the computing device, in a first mode in which one or more segment identifiers are used for multiple segments in a group; and
   operating, by the computing device, in a second mode in which all segments in a group are assigned different segment identifiers and stitched.

15. The method of claim 12, wherein the group includes a first single-segment set of geometry work, followed by a segmented set of geometry work, followed by a final single-segment set of geometry work, the method comprising:
   using the same segment identifier for an initial segment of the segmented set of geometry work and the first single-segment set of geometry work; and
   deferring linking outputs of the segmented set until processing of the final single-segment set of geometry work.

16. The method of claim 12, wherein the group includes a single-segment set of geometry work, followed by a first segmented set of geometry work, followed by a final segmented set of geometry work, the method comprising:
   using the same segment identifier for a last segment of the first segmented set of geometry work and an initial segment of the final segmented set of geometry work.

17. The method of claim 12, wherein the linked outputs include:
   a list of closed memory pages for the group; and
   a region array for tile-based deferred rendering that includes an entry per tile of a graphics frame that indicates geometry for the tile.

18. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
   geometry processing circuitry configured to:
      execute multiple segments of a segmented set of geometry work at least partially in parallel using multiple geometry processing pipelines;
      execute a single-segment set of geometry work using a single geometry processing pipeline;
      identify a group of multiple sets of geometry work that includes the segmented set and the single-segment set;
   fragment processing circuitry configured to initiate execution of a single set of fragment processing work that consumes output data from the multiple sets of geometry work in the group; and
   stitch circuitry configured to link outputs of the segmented set for processing by the fragment processing circuitry;
   wherein the geometry processing circuitry is configured to utilize a same segment identifier and output data structure for both the single-segment set and a first segment of the segmented set, such that the fragment processing circuitry receives the output data without a stitching operation between the single-segment set and the first segment of the segmented set.

19. The non-transitory computer readable storage medium of claim 18, wherein the circuit further includes control circuitry configured to generate one or more control fields that specify the following information for one or more segments:
   stitch enable information that indicates whether stitching is enabled;
   initial segment information that indicates the first segment of the group;
   last segment information that indicates the last segment of the group; and
   complete stitch information that indicates whether a segment is the youngest segment of a non-final set of geometry work.

20. The non-transitory computer readable storage medium of claim 18, wherein the geometry processing circuitry is configured to process segments according to:
  a first mode in which one or more segment identifiers are used for multiple segments in a group; and
  a second mode in which all segments in a group are assigned different segment identifiers and stitched.

* * * * *